United States Patent
Doi et al.

(10) Patent No.: US 7,155,162 B2
(45) Date of Patent: Dec. 26, 2006

(54) RADIO BASE STATION AND PROGRAM RECORDED MEDIUM

(75) Inventors: Yoshiharu Doi, Gifu (JP); Tadayoshi Itou, Kaizu-gun (JP)

(73) Assignee: Sanyo Electric Co., Ltd., Osaka (JP)

(*) Notice: Subject to any disclaimer, the term of this patent is extended or adjusted under 35 U.S.C. 154(b) by 350 days.

(21) Appl. No.: 10/240,530

(22) PCT Filed: Mar. 30, 2001

(86) PCT No.: PCT/JP01/02832

§ 371 (c)(1),
(2), (4) Date: Sep. 30, 2002

(87) PCT Pub. No.: WO01/76102

PCT Pub. Date: Oct. 11, 2001

(65) Prior Publication Data

US 2003/0139152 A1   Jul. 24, 2003

(30) Foreign Application Priority Data

Apr. 3, 2000   (JP) .............................. 2000-101498

(51) Int. Cl.
*H04B 7/00* (2006.01)
*H04B 1/00* (2006.01)
*H04B 7/01* (2006.01)
*H04M 1/00* (2006.01)

(52) U.S. Cl. .................. 455/39; 455/63.1; 455/69; 455/101; 455/502

(58) Field of Classification Search .......... 455/562.1, 455/507, 517, 67.11, 65, 450–452.1, 509, 455/63.1, 68–69, 70–71, 101, 502; 370/282, 370/334, 347; 375/135, 136, 141
See application file for complete search history.

(56) References Cited

U.S. PATENT DOCUMENTS

| | | | |
|---|---|---|---|
| 5,909,470 A | | 6/1999 | Barratt et al. |
| 5,930,243 A | * | 7/1999 | Parish et al. ............... 370/334 |
| 5,936,577 A | * | 8/1999 | Shoki et al. ............... 342/373 |
| 5,940,453 A | | 8/1999 | Golden |
| 6,115,426 A | * | 9/2000 | Fujimoto et al. .......... 375/260 |
| 6,122,260 A | * | 9/2000 | Liu et al. .................. 370/280 |
| 6,128,276 A | * | 10/2000 | Agee ....................... 370/208 |
| 6,154,661 A | * | 11/2000 | Goldburg ................ 455/562.1 |
| 6,192,256 B1 | * | 2/2001 | Whinnett ................ 455/562.1 |
| 6,240,098 B1 | * | 5/2001 | Thibault et al. ........... 370/431 |
| 6,275,543 B1 | * | 8/2001 | Petrus et al. ............. 375/324 |
| 6,480,522 B1 | * | 11/2002 | Hoole et al. .............. 375/130 |
| 6,615,024 B1 | * | 9/2003 | Boros et al. ............. 455/67.14 |
| 6,678,253 B1 | * | 1/2004 | Heath et al. .............. 370/265 |
| 2002/0150070 A1 | * | 10/2002 | Shattil .................... 370/342 |

FOREIGN PATENT DOCUMENTS

| | | |
|---|---|---|
| JP | 11-046113 | 2/1999 |
| JP | 11-1123987 | 4/1999 |
| JP | 11-127107 | 5/1999 |

(Continued)

*Primary Examiner*—Simon Nguyen

(57) ABSTRACT

A frequency estimation unit (57) and a timing estimation unit (58) respectively detect a frequency offset and a timing offset from a signal received from a mobile station via a control channel. A weight calculation unit (53) corrects reception signals received via a communication channel, using the detected frequency offset and timing offset when new wireless connection to the mobile station is performed by forming an antenna directivity. A signal intended for the mobile station is separated from the corrected reception signals with high accuracy.

5 Claims, 5 Drawing Sheets

FOREIGN PATENT DOCUMENTS

| | | |
|---|---|---|
| JP | 11-308036 | 11/1999 |
| JP | 2000091844 A | 3/2000 |
| JP | 2000324031 A | 11/2000 |
| JP | 2001007754 A | 1/2001 |
| WO | WO 94/21057 | 9/1994 |
| WO | WO 94/28643 | 12/1994 |
| WO | WO 98/17037 | 4/1998 |
| WO | WO 98/17071 | 4/1998 |

* cited by examiner

RADIO BASE STATION AND PROGRAM RECORDED MEDIUM

TECHNICAL FIELD

The present invention relates to a wireless base station that wirelessly connects a plurality of mobile stations by spatial multiplexing using an array antenna, and to a program storage medium storing a program readable by a digital signal processor provided in the wireless base station.

BACKGROUND ART

In recent years, increasing social demand has been emerging to make efficient use of frequency resources, along with increasing widespread of mobile stations such as PHS (personal handyphone system) handsets and mobile telephones. One of the communication methods that responds to this demand is a spatial multiplexing method.

The spatial multiplexing method is a communication method for multiplexing transmission and reception signals to and from a plurality of mobile stations and achieving simultaneous communication between the mobile stations on a single frequency, by forming a different directivity pattern for each mobile station with the use of an adaptive array apparatus.

An adaptive array apparatus is equipped with a plurality of antennas, and adjusts the amplitude and phase of the transmission and reception signals of each antenna, to form a directivity pattern (an array antenna pattern) of the antennas as a whole.

A wireless base station that wirelessly connects a plurality of mobile stations by spatial multiplexing is constructed to use such an adaptive array apparatus. To separate a reception signal intended for each mobile station from the multiplexed reception waves transmitted from the plurality of mobile stations, the wireless base station calculates, for each mobile station, a weight coefficient (also referred to as a "weight vector") that is used to adjust the amplitude and phase of reception waves (reception signals) of each antenna. A weight vector can be calculated by a DSP (Digital Signal Processor) in the following way. In the equation below, the DSP adjusts values of "W1 (t−1)" to "W4 (t−1)" so as to minimize an error range "e(t)". The DSP then sets the adjusted values of "W1 (t−1)" to "W4 (t−1)" as weight vectors "W1 (t)" to "W4 (t)" for a symbol at the timing "t".

Equation $$e(t)=d(t)-(W1(t-1)\star X1(t)+W2(t-1)\star X2(t)+W3(t-1)\star X3(t)+W4(t-1)\star X4(t))$$

Here, the legend "t" represents a timing in symbol units, the legend "d(t)" represents symbol data in a known reference signal (or in a training signal), the legends "X1 (t)" to "X4 (t)" represent reception signals of four antennas, and the legends "W1 (t−1)" to "W4 (t−1)" represent initial values for weight vectors of these four antennas. It should be noted here that the initial values may be freely chosen, but weight vectors of these four antennas calculated for the preceding symbol or in the preceding reception timeslot are generally used as the initial values.

In short, weight vectors are calculated so as to minimize a difference between (a) a sum of values each obtained by multiplying the reception wave (reception signal) of each of the four antennas by its weight vector, and (b) the reference signal. The reference signal includes bits (or symbol data) of a known bit sequence (or a symbol sequence) contained in a control signal on a control channel or a communication signal on a communication channel. For PHS, for example, fixed bit sequences, such as PR (preamble) and UW (Unique Word), contained in reception signals are used as the reference signal.

As described above, the wireless base station separates a reception signal intended for each mobile station from multiplexed reception waves, by calculating, for each of a plurality of mobile stations that are to be spatially multiplexed, a weight vector of each antenna and weighting the multiplexed reception waves transmitted from the plurality of mobile stations. At the time of transmission, the wireless base station forms a directivity pattern by weighting transmission signals using the weight vectors calculated at the time of reception. It should be noted here that spatial multiplexing is also referred to as PDMA (Path Division Multiple Access), and is described in detail in "Mobile Communication using PDMA" in Shingaku Giho (Communication Studies) RCS 93–84 (1994-01), pp37–44.

The calculation of weight vectors and separation of signals are easy if a value of the above reference signal varies depending on each of the mobile stations that are to be connected wirelessly by spatial multiplexing. In the case of PHS, however, the fixed bit sequences such as the above-mentioned PR and UW, used as the reference signal, are common to every mobile station. In some cases, therefore, correct weight vectors cannot be calculated, and accordingly a signal cannot be separated accurately. To be more specific, in the multiplexed reception signals from the plurality of mobile stations, if the center frequencies of signals intended for all the mobile stations completely match, and timings of symbols-the minimum unit of transmission and reception data-for all the mobile stations completely match, correct weight vectors cannot be calculated, and therefore a desired signal cannot be separated.

However, each mobile station actually generates an internal timing clock and a carrier wave frequency signal on its own, which inevitably creates an error range of several ppm. Accordingly, it is extremely unusual that the symbol timings for all the mobile stations completely match and at the same time the center frequencies of carrier waves intended for all the mobile stations completely match.

By taking advantage of this fact, it is considered possible for the wireless base station to calculate correct weight vectors, by detecting a deviation of the symbol timing and a deviation of the carrier wave frequency for each mobile station, and reflecting the detected deviations in reception waves of each antenna.

However, the above conventional technique has the following problem. At the time of transfer from a control channel to a communication channel, i.e., when new wireless connection to a mobile station is performed by spatial multiplexing, a deviation of the symbol timing and a deviation of the carrier wave frequency of the mobile station are unknown to the wireless base station. Accordingly, the wireless base station has a low chance of calculating correct weight vectors for the mobile station. This may even cause a failure in establishing a communication channel to initiate spatial multiplexing of the mobile station. If such a failure occurs, the wireless base station has to retry establishing another communication channel.

For example, mobile stations such as PHS handsets and mobile telephones use a control channel for a standby mode to receive a call and a communication channel for communication. Therefore, immediately after the transfer from a control channel to a communication channel that is subjected to spatial multiplexing at the time of call-in or call-out, a deviation of the symbol timing and a deviation of the carrier wave frequency are unknown. This is no problem if the wireless base station could detect these deviations immediately after the transfer to the communication channel, but actually, the wireless base station is not able to detect these deviations until separating a signal intended for the newly connected mobile station using correct weight vectors. This means that the wireless base station cannot utilize a deviation of the symbol timing and a deviation of the carrier wave frequency immediately after the transfer from a control channel to a communication channel, and accordingly, cannot calculate weight vectors with high accuracy.

In view of the above problem, the object of the present invention is to provide a wireless base station that improves accuracy of separating a signal intended for a mobile station when new wireless connection to the mobile station is performed by forming an antenna directivity, and that ensures establishment of a communication channel.

DISCLOSURE OF THE INVENTION

To achieve the above object, the wireless base station of the present invention wirelessly connects a plurality of mobile stations by spatial multiplexing using an array antenna, and includes: a detection unit for detecting a deviation of a signal that has been received from a mobile station; and a separation unit for separating a signal intended for the mobile station from reception signals using the detected deviation, when new wireless connection to the mobile station is performed by forming an antenna directivity.

According to this construction, the separation unit can correct reception signals using the deviation detected by the detection unit when separating a signal intended for the mobile station from the reception signals. Therefore, the signal intended for the mobile station can be separated with higher accuracy compared with the case where the deviation is unknown.

Also, the wireless base station of the present invention transfers a plurality of mobile stations from control channels to communication channels and wirelessly connects the plurality of mobile stations by spatial multiplexing using an array antenna via the communication channels, and includes: a detection unit for detecting a deviation of a signal that has been received from a mobile station via a control channel; and a separation unit for separating a signal intended for the mobile station from reception signals via a communication channel using the detected deviation, when new wireless connection to the mobile station is performed by forming an antenna directivity.

According to this construction, the separation unit can correct reception signals using the deviation detected by the detection unit, when transferring to a communication channel and forming an array antenna pattern. Therefore, the signal intended for the mobile station can be separated with higher accuracy compared with the case where the deviation is unknown, and further, establishment of a communication channel can be ensured.

Here, the deviation may be at least one of (a) a timing offset that indicates a deviation of a timing at which the signal was received from the mobile station in a periodical reception timeslot of the wireless base station, from a specific timing in the periodical reception timeslot being set as a reference, and (b) a frequency offset that indicates a deviation of a frequency of a carrier wave allocated to the mobile station, from a frequency of the signal that has been received from the mobile station.

Also, the detection unit may include: a first detection unit for detecting a timing offset that indicates a deviation of a timing at which the signal was received from the mobile station in a periodical reception timeslot of the wireless base station, from a specific timing in the periodical reception timeslot being set as a reference; and a second detection unit for detecting a frequency offset that indicates a deviation of a frequency of a carrier wave allocated to the mobile station, from a frequency of the signal that has been received from the mobile station, and the separation unit may correct the reception signals using the timing offset and the frequency offset, and separate the signal intended for the mobile station from the corrected reception signals.

According to this construction, the separation unit can correct reception signals using the frequency offset and the timing offset detected by the detection unit. Therefore, one or both of the frequency and the reception timing of the reception signals can be matched with those of the signal intended for the mobile station with higher accuracy, in an early stage of forming an array antenna pattern.

Here, the first detection unit and the second detection unit may detect the timing offset and the frequency offset in a reception timeslot in which a communication channel request message has been received from the mobile station via a control channel, the communication channel request message requesting to establish a communication channel, and the separation unit may correct, using the timing offset and the frequency offset, the reception signals in a reception timeslot in which a synchronization signal has been received from the mobile station via the communication channel, the synchronization signal being transmitted to follow the communication channel request message.

According to this construction, a link channel establishment can further be ensured when the wireless base station is used as a PHS base station.

Also, the detection unit may further include a calculation unit for calculating weight vectors for the mobile station, by performing array reception in the reception timeslot of the communication channel request message, and the separation unit may use the weight vectors as initial values, to separate the signal intended for the mobile station in the reception timeslot of the synchronization signal.

According to this construction, the separation unit can further use the initial values of weight vectors, and therefore, calculation accuracy of weight vectors necessary for separating a signal can be improved, that is, values of the weight vectors can converge in an earlier timing in a reception timeslot.

The program storage medium of the present invention stores a program readable by a digital signal processor provided in a wireless base station that forms an array antenna pattern, the program realizing: a detection unit for detecting a timing offset and a frequency offset of a signal that has been received from a mobile station via a control channel; and a separation unit for correcting reception signals using the detected timing offset and frequency offset and separating a signal intended for the mobile station from the corrected reception signals, when new wireless connection to the mobile station is performed by forming an antenna directivity, wherein the timing offset indicates a deviation of a timing at which the signal was received from the mobile station in a periodical reception timeslot of the wireless base station, from a specific timing in the periodical reception timeslot being set as a reference, and the frequency offset indicates a deviation of a frequency of a carrier wave allocated to the mobile station, from a frequency of the signal that has been received from the mobile station.

When the separation unit in the wireless base station executing the program stored in the program storage medium separates a signal intended for the mobile station from reception signals, the separation unit can correct the reception signals using the deviation detected by the detection unit. Therefore, the signal intended for the mobile station can be separated with higher accuracy compared with the case where the deviation is unknown.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 is a block diagram showing the construction of a user processing unit 51a;

BEST MODE FOR CARRYING OUT THE INVENTION

[First Embodiment]

A wireless base station in a first embodiment of the present invention wirelessly connects a plurality of mobile stations using a plurality of antennas by weighting the transmission and reception signals of each antenna to form a directivity pattern (hereafter referred to as an "array antenna pattern") for each mobile station. The wireless base station is installed as a PHS base station for connecting PHS handsets in accordance with the TDMA/TDD (Time Division Multiple Access/Time Division Duplex) method defined by the PHS standard. In this specification, transmission and reception achieved by forming a directivity pattern (called an "array antenna pattern") are respectively referred to as "array-transmission" and "array-reception", whereas transmission and reception achieved by forming a nondirectional pattern (also called an "omnidirectional pattern") are respectively referred to as "omni-transmission" and "omni-reception". Also, a control channel is referred to as a "CCH", and a traffic channel as a "TCH".

The wireless base station is constructed to detect deviations (a frequency offset and a timing offset) of a signal that has been received from a mobile station via a CCH, and perform array-reception using the detected deviations when initiating new wireless connection to the mobile station via a TCH.

[Overall Construction]

Figure 1:
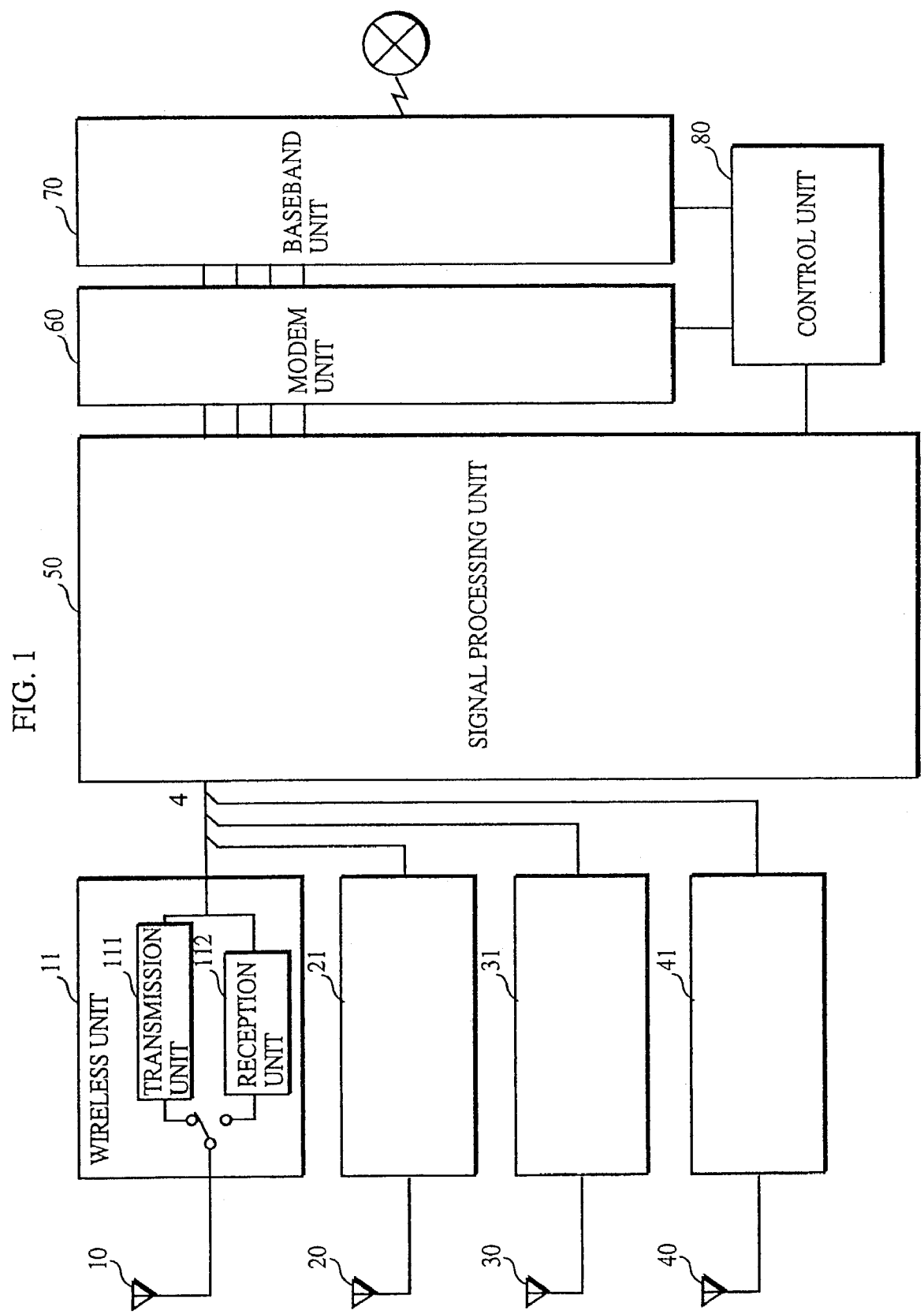
FIG. 1 is a block diagram showing the construction of a wireless base station in a first embodiment of the present invention.

FIG. 1 is a block diagram showing the construction of the wireless base station in the first embodiment. In the figure, the wireless base station includes a baseband unit 70, a modem unit 60, a signal processing unit 50, wireless units 11, 21, 31, and 41, antennas 10 to 40, and a control unit 80.

The baseband unit 70 is provided between a plurality of telephone lines connected via a telephone exchange and the modem unit 60, and performs a TDMA/TDD process on each of a plurality signals (baseband signals containing speech or data) to be spatially multiplexed. The TDMA/TDD process is a process for multiplexing and separating the plurality of signals, so as to fit in a TDMA/TDD frame. Here, a TDMA/TDD frame has a period of 5 milliseconds, and is divided into eight timeslots, forming four transmission timeslots and four reception timeslots.

In detail, as to signals transmitted from the plurality of telephone lines to the modem unit 60, the baseband unit 70 multiplexes four signals into each TDMA/TDD frame according to time division multiplexing, and further, outputs a maximum of four signals per transmission timeslot to the modem unit 60 according to spatial multiplexing. On the other hand, as to signals transmitted from the modem unit 60 to the plurality of telephone lines, the baseband unit 70 receives an input of a maximum of four signals per reception timeslot from the modem unit 60, and further, separates the time division multiplexed signals and outputs the resulting signals to the plurality of telephone lines.

The modem unit 60 modulates signals that are inputted from the baseband unit 70 and demodulates signals that are inputted from the signal processing unit 50. The $\pi/4$-shift QPSK method is used for the modulation and demodulation.

In a reception timeslot, the signal processing unit 50 calculates weight vectors used for forming an array antenna pattern and detects a timing offset and a frequency offset. In a transmission timeslot, the signal processing unit 50 weights transmission signals using the weight vectors calculated in the reception timeslot. A "timing offset" referred to herein is a deviation of a timing at which a signal is received from a mobile station in a periodical reception timeslot in the wireless base station, from the beginning timing of the periodical reception timeslot being set as a reference. A "frequency offset" referred to herein is a deviation of a center frequency of a carrier wave allocated to the mobile station, from a center frequency of a signal that is actually received from the mobile station.

To be more specific, the signal processing unit 50 first detects a timing offset and a frequency offset, when a link channel establishment request requesting allocation of a TCH is received from a mobile station via a CCH, and then responds to the request by transmitting a link channel allocation (a carrier wave frequency number and a slot number) via the CCH. The signal processing unit 50 then calculates weight vectors using the detected timing offset and frequency offset, when receiving a first signal (a sync burst) via the allocated TCH.

At the time of array-transmission, the wireless units 11, 21, 31, and 41 convert each signal weighted by the signal processing unit 50 into an RF signal and transmits the converted signal via the antennas 10 to 40. At the time of array-reception, the wireless units 11, 21, 31, and 41 convert a signal received via the antennas 10 to 40 into a signal in a baseband region, and outputs the converted signal to the signal processing unit 50. At the time of omni-transmission and omni-reception, only the wireless unit 11 operates in this way, and the wireless units 21, 31, and 41 stop operating.

The control unit 80 gives the signal processing unit 50 an instruction as to which one of array-transmission (or array-reception) and omni-transmission (or omni-reception) is to be performed in each timeslot. To be more specific, the control unit 80 instructs the signal processing unit 50 to perform principally, (a) array-reception for receiving a control signal, and (b) omni-transmission for transmitting a control signal, and (c) array-transmission and array-reception for transmitting and receiving a communication signal via a TCH. It should be noted that a signal can be received via a CCH either by array-reception or omni-reception. In the case of array-reception, weight vectors are calculated and so can be utilized when a communication signal is received via a TCH.

[Transfer Sequence to TCH]

Figure 4:
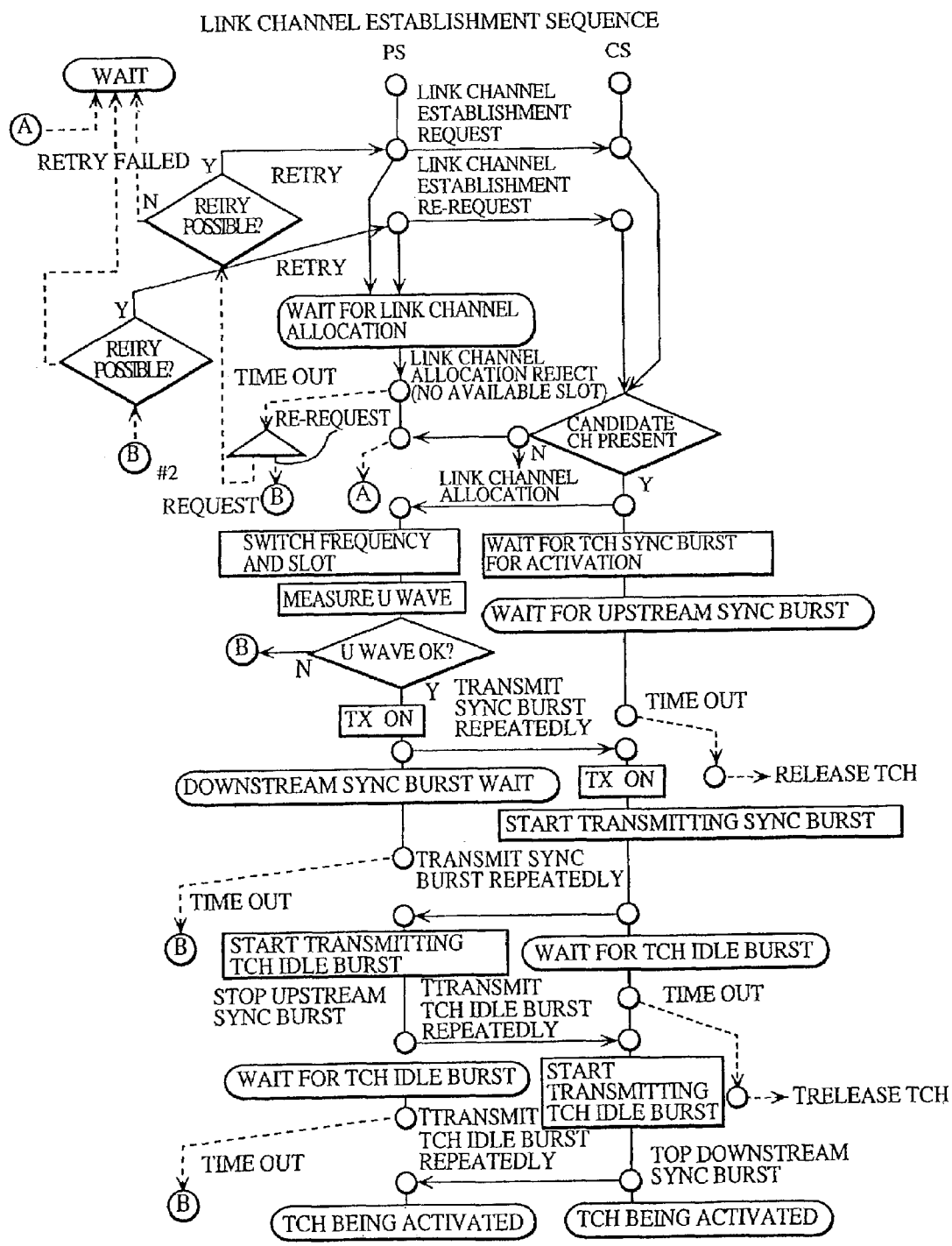
FIG. 4 shows a link channel establishment sequence.

FIG. 4 shows a sequence for transferring from a CCH to a TCH (called a "link channel establishment sequence"). This sequence is conform to the PHS standard, and therefore is not explained in detail in this specification. Here, an explanation is only focused on a "link channel establishment request (re-request)" and a "sync burst". During the transfer from a CCH to a TCH, the "link channel establishment request (re-request)" is a signal that the wireless base station receives lastly on the CCH, and a "sync burst" is a signal that the wireless base station receives firstly on the TCH.

A "link channel (hereafter, "L_ch") establishment request" is transmitted from a mobile station to the wireless base station when the transfer to a TCH is to be performed, for example, at the time of location registration, call-in, call-out, handover, channel switch, etc. The L_ch establishment request is a message requesting allocation of a TCH and a link. The L_ch establishment re-request is the same message as the L_ch establishment request and is transmitted from the mobile station to the wireless base station after the L_ch establishment request, due to timeout or the like. These messages are the last signals that the wireless base station receives on the CCH, during the transfer from the CCH to the TCH, and therefore, the frequency offset and timing offset have already been detected by the signal processing unit 50.

A "sync burst" is a message transmitted via the allocated TCH for synchronizing the mobile station with the TCH to the wireless base station. The mobile station repeatedly transmits the sync burst until the wireless base station responds to it (by transmitting a sync burst).

The sync burst is the first signal that the wireless base station receives on the TCH, and therefore, the frequency offset and timing offset are unknown until the sync burst is actually received. However, the frequency offset and timing offset are considered similar to a frequency offset and a timing offset detected for the same mobile station on the CCH. Therefore, when receiving the sync burst, the wireless base station corrects the reception signals using the frequency offset and timing offset detected by the signal processing unit 50 on the CCH, and then calculates weight vectors. By doing so, the weight vectors can be calculated with high accuracy.

[Construction of the Signal Processing Unit 50]

Figure 2:
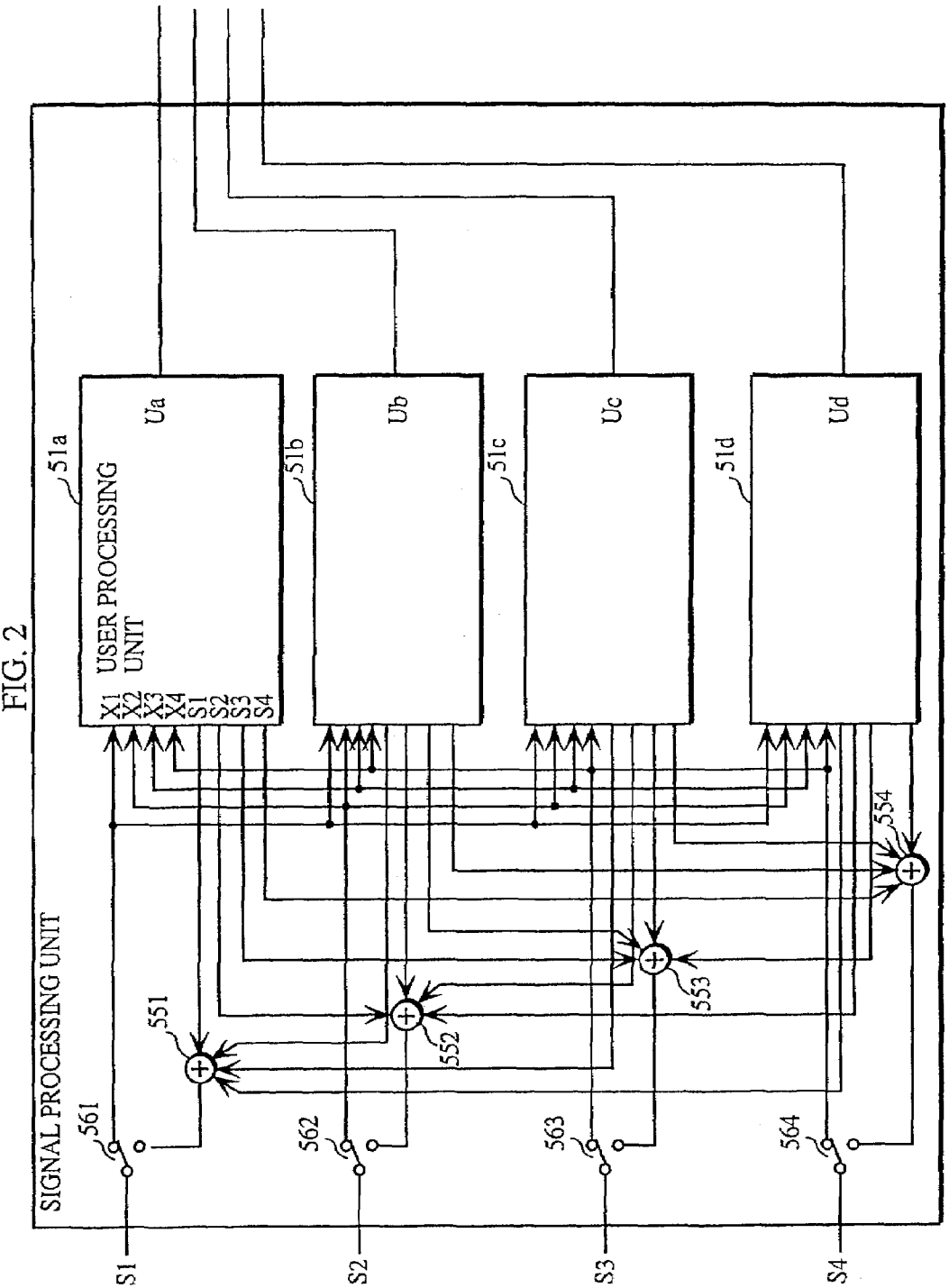
FIG. 2 is a block diagram showing the construction of a signal processing unit 50.

FIG. 2 is a block diagram showing the construction of the signal processing unit 50. The figure is a block diagram showing functions realized by the DSP executing a program.

In the figure, the signal processing unit 50 includes user processing units 51a to 51d, adders 551 to 554, and switches 561 to 564. The switches 561 to 564 switch between transmission and reception. The signal processing unit 50 calculates weight vectors and weights transmission or reception signals using the calculated weight vectors, when being instructed to perform array-transmission or array-reception by the control unit 80.

The user processing units 51a to 51d are provided in correspondence with a maximum of four user signals to be spatially multiplexed in each timeslot. In a reception timeslot, each user processing unit corrects reception signals using a frequency offset and a timing offset, and then calculates weight vectors. Using the calculated weight vectors, each user processing unit combines reception signals inputted from the wireless units 11 to 41 via the switch 561 to 564, to extract a user signal. In a transmission timeslot, each user processing unit weights a user signal using the weight vectors calculated in the preceding reception timeslot, and outputs the weighted user signal to the corresponding wireless unit.

The adder 551 combines weighted elements of each user transmission signal outputted to the wireless unit 11. The adders 552 and 554 are the same as the adder 551, with the only difference being that the adders 552 and 554 correspond to the wireless unit 21 to 41.

[Construction of the User Processing Unit]

The user processing units 51a to 51d are all the same, with the user processing unit 51a being described as a representative example.

Figure 3:
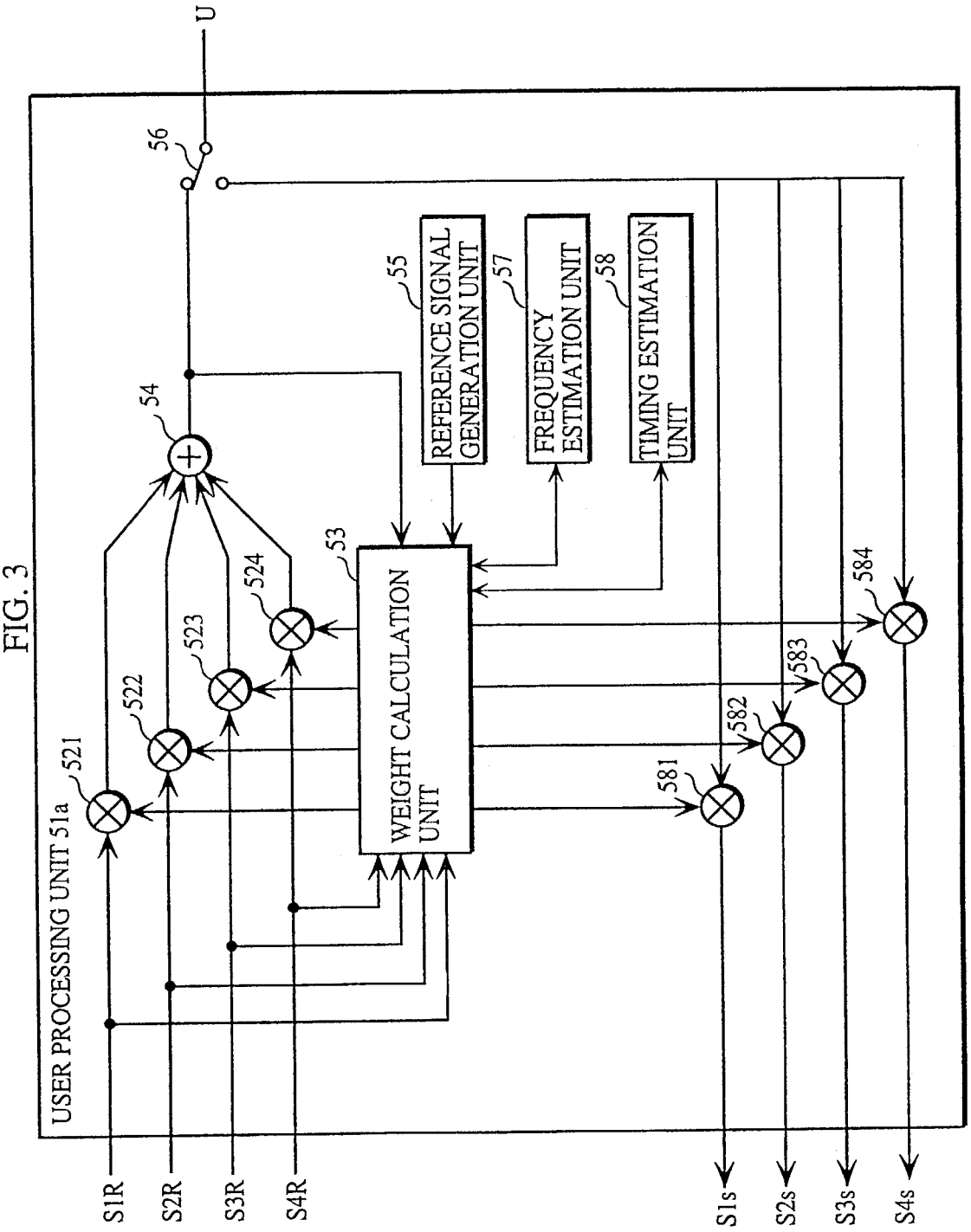

FIG. 3 is a block diagram showing the construction of the user processing unit 51a. The user processing unit 51a includes a weight calculation unit 53, an adder 54, a reference signal generation unit 55, a switch 56, a frequency estimation unit 57, a timing estimation unit 58, multipliers 521 to 524, and multipliers 581 to 584.

The weight calculation unit 53 calculates, in each symbol period during a fixed bit pattern period in a reception timeslot, weight vectors, so as to minimize a sum of differences between (a) each of the reception signals "S1R" to "S4R" from the wireless units 11 to 41 and (b) a reference signal generated by the reference signal generation unit 55. Here, the weight calculation unit 53 corrects a frequency and a timing of reception signals using a frequency offset and a timing offset detected in the preceding reception timeslot by the frequency estimation unit 57 and the timing estimation unit 58, and then calculates the weight vectors. Here, the "preceding reception timeslot" with respect to a first reception timeslot on a TCH to which the transfer is performed is a reception timeslot of a signal lastly received on a CCH from which the transfer is performed. The "preceding reception timeslot" with respect to any reception timeslots following the first reception timeslot on the TCH is the preceding reception timeslot of a signal that has been normally received.

To be more specific, in the equation below, the weight calculation unit 53 adjusts values of "W1 (t−1)" to "W4 (t−1)" so as to minimize an error range "e(t)", and sets the adjusted values of "W1 (t−1)" to "W4 (t−1)" as weight vectors "W1 (t)" to W4 (t) for a symbol at the timing "t".

Equation $$e(t)=d(t)-(W1(t-1)\star X1'(t)+W2(t-1)\star X2'(t)+W3(t-1)\star X3'(t)+W4(t-1)\star X4'(t))$$

Here, the legend "t" represents a timing in symbol units, the legend "d(t)" represents symbol data in a known reference signal (or in a training signal), and the legends "W1 (t−1)" to "W4 (t−1)" represent weight vectors of the respective antennas each calculated for the preceding symbol, or weight vectors of the respective antennas each calculated in the preceding reception timeslot.

Also, the legends "X1'(t)" to "X4'(t)" represent reception signals corrected by the weight calculation unit 53, and can be expressed using complex numbers as follows.

$$X1'(t)=X1(t+\Delta t)\exp(j\Delta\theta t)$$

$$X2'(t)=X2(t+\Delta t)\exp(j\Delta\theta t)$$

$$X3'(t)=X3(t+\Delta t)\exp(j\Delta\theta t)$$

$$X4'(t)=X4(t+\Delta t)\exp(j\Delta\theta t)$$

Here, the legends "X1 (t)" to "X4 (t)" represent reception signals of the antennas 10 to 40, the legend "Δt" represents a timing offset detected by the timing estimation unit 58, and the legend "Δθ" represents a frequency offset detected by the frequency estimation unit 57. At the transfer from a CCH to a TCH, in a first reception timeslot via the TCH, the legends "Δt", "Δθ", and "W(t−1)" in the above equations represent values detected (calculated) in a reception timeslot of a signal received lastly via the CCH.

The weight vectors are adjusted for each symbol in the above-described way. Even if an error range "e(t)" is large at the beginning of a reference signal period within a reception timeslot, the error range "e(t)" converges on the minimum (or converges on zero) by the end of the reference signal period.

Further, in a reception timeslot, the weight calculation unit 53 outputs the calculated weight vectors to the multipliers 521 to 524, in a symbol period during which the weight vectors are calculated and in the following symbol periods. In a transmission timeslot, the weight calculation unit 53 outputs weight vectors calculated in the corresponding immediately preceding reception timeslot, to the multipliers 581 to 584.

The reference signal generation unit 55 outputs symbol data to the weight calculation unit 53, to be matched with the symbol timing in a reception period of a known bit pattern (a fixed symbol) in a reception timeslot.

The frequency estimation unit 57 detects a frequency offset "Δθ(=2πΔf)" or "Δf" of a reception signal in a reception timeslot, that is, a deviation of a center frequency of an allocated carrier wave from a center frequency of an actually received signal, at the point where the weight vectors calculated for each symbol by the weight calculation unit 53 converge, or at the point where weight vectors for a symbol corresponding to last symbol data within the reference signal are calculated.

The detection of a frequency offset may be performed, for example, in accordance with a method described in "*Ido Tuushin No Tameno Digital HenHukucho Gijyutsu* (Digital Modulation/Demodulation Techniques for Mobile Radio Communications), White Series No. 105", TRICEPS, Mar. 14, 1990, P54.

The timing estimation unit 58 detects a timing offset of a reception signal in a reception timeslot. In other words, the timing estimation unit 58 detects a time period from the beginning of the reception timeslot to the beginning of the reception signal (for example, to the beginning of SS (start symbol)), as the timing offset.

To be more specific, the timing offset is detected by utilizing a timing at which UW is received. The UW is a symbol sequence for establishing synchronization of the symbol level defined by the PHS standard. A wireless base station in general has a detection window for detecting the beginning location of UW that corresponds to several symbols, at the timing location set by adding the TDMA/TDD frame time period (5 milliseconds) to the timing at which the preceding UW is received. The wireless base station judges at which timing in the detection window the beginning of UW is received. This judgment is performed in units of, for example, ⅛ or ¹⁄₁₆ symbol time periods. The wireless base station of the present invention judges the reception timing of the beginning of UW in a symbol sequence separated using weight vectors calculated by the weight calculation unit 53. The timing estimation unit 58 converts the reception timing of the beginning of UW into the beginning timing of SS, so as to obtain the timing offset.

In a reception timeslot, the multipliers 521 to 524, and the adder 54 weight the reception signals "X1" to "X4" from the wireless units 11 to 41 using weight vectors outputted from the weight calculation unit 53, and combines the weighted signals. The resulting combined signals are reception symbols of a user "a", extracted out of spatially multiplexed reception signals for a maximum of four users "a" to "d".

In a transmission timeslot, the multipliers 581 to 584 weight transmission symbols of the user "a", separately for each of the wireless units 11 to 41, using the corresponding one of the weight vectors outputted from the weight calculation unit 53.

[TCH Transfer Process]

Figure 5:
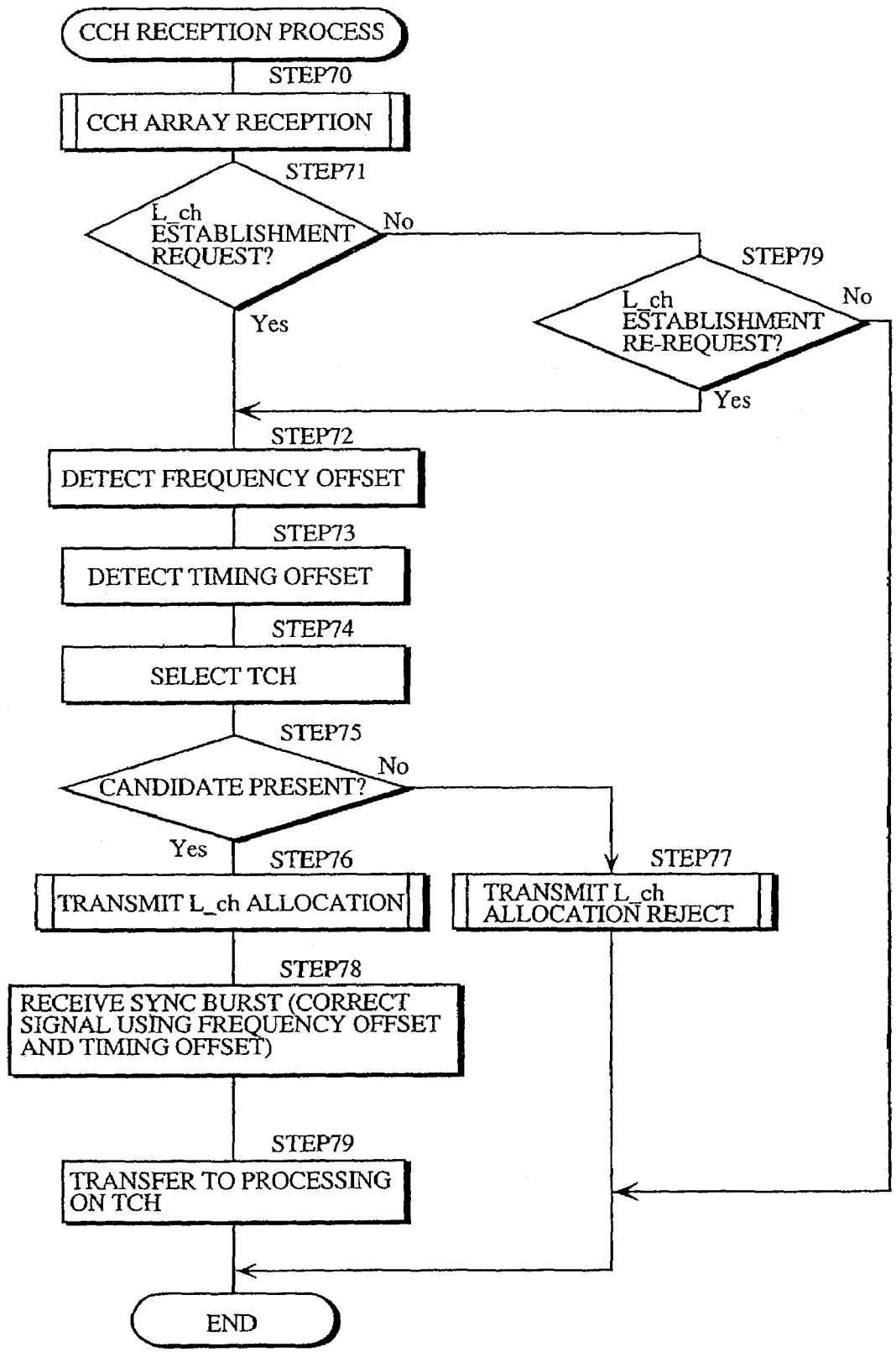
FIG. 5 is a flowchart showing the processing for transferring a mobile station from a control channel (CCH) to a traffic channel (TCH).

FIG. 5 is a flowchart showing a process for transferring a mobile station from a CCH to a TCH in the wireless base station. The figure shows the processing performed at the wireless base station side in the L_ch establishment sequence shown in FIG. 4.

The control unit 80 has instructed the signal processing unit 50 to perform array-reception in a reception timeslot on a CCH. Therefore, control signals are constantly received from a mobile station by array-reception, after the weight vectors being calculated, the signals being weighted using the weight vectors, and the weighted signals being combined, by the signal processing unit 50 (step 70).

When a control signal received as a result of this array-reception shows an L_ch establishment request (step 71), the frequency estimation unit 57 and the timing estimation unit 58 respectively detect a frequency offset and a timing offset (steps 72 and 73). Further, the control unit 80 selects a candidate for a TCH using an available time division channel or an available spatially multiplexed channel within the TDMA/TDD frame (step 74).

When being unable to select a candidate for a TCH, the control unit 80 instructs the signal processing unit 50 to perform omni-transmission or array-transmission and to transmit an L_ch allocation reject (step 77).

When being able to select a candidate for a TCH, the control unit 80 instructs the signal processing unit 50 to transmit an L_ch allocation via the CCH (step 76), and receives a sync burst (step 78). Here, the signal processing unit 50 corrects reception signals using the frequency offset and the timing offset detected in steps 72 and 73, and calculates weight vectors using the weight vectors calculated in step 70 as initial values. The following processing (step 79) is the same as described in FIG. 4.

When the control signal received in step 70 shows an L_ch establishment re-request, too, the control unit 80 performs the above processing in steps 72 to 79.

As described above, the wireless base station in the present embodiment utilizes, at the transfer from a CCH to a TCH, a frequency offset, a timing offset, and weight vectors from a signal received via the CCH. Therefore, weight vectors can be calculated with high accuracy even immediately after the transfer to the TCH.

[Other Modifications]

(1) Although the above embodiment describes the case where a TCH to be allocated to a mobile station is selected in steps 74 and 75 in FIG. 5, the TCH to be allocated may be selected in advance. For example, the wireless base station may periodically perform a TCH selection process, and transmit an L_ch allocation, immediately after receiving an L_ch allocation request. By doing so, the transfer to the TCH can be performed before a timing offset is fluctuated drastically by a change in a propagation environment due to movement of the mobile station or the like. Therefore, weight vectors can be calculated with higher accuracy.

(2) Although the above embodiment describes the case where a reception signal is received on a CCH by array-reception, it maybe received by omni-reception. In such a case, initial values for weight vectors can be separately set in a first reception timeslot on a TCH at the transfer. In this case, too, a timing offset and a frequency offset obtained from a reception signal on a CCH are utilized at the transfer to the TCH, and therefore, weight vectors can be calculated with higher accuracy.

(3) Also, when a reception signal is received on a CCH by omni-reception, the timing estimation unit 58 may use a rising timing and a falling timing of a reception field intensity within a timeslot, to detect a timing at which the beginning of SS is received.

(4) Although the above embodiment describes the case where a "timing offset" is a deviation of a timing at which the beginning of SS is received in a reception timeslot, from the beginning of the reception timeslot being set as a reference, it may be a deviation of a timing at which the beginning of UW is received, or a deviation of a timing at which another specific symbol is received. Also, although the above embodiment describes the case where the beginning of the reception timeslot is set as a reference, a timing at which a certain time period elapses from the beginning of the reception timeslot may instead be set as a reference.

(5) Although four antennas and four wireless units are shown in FIG. 1, more or less antennas and wireless units may be provided.

(6) Although the above embodiment describes the case where the wireless base station is applied to a PHS base station, it is applicable to any other communication systems, as long as they are telephone systems that use a control channel and a communication channel for different purposes, and initiate communication after transferring from a control channel to a communication channel.

(7) As described above, the essential components of the present invention in the wireless base station are realized by the signal processing unit 50 provided in the adaptive array apparatus, i.e., the digital signal processor, executing a program. This program may be stored in a PROM (programmable read only memory), an EEPROM (electrically erasable and programmable ROM), or a RAM. The version-up of the program is achieved by replacing the ROM, and also, the program can be downloaded to an EEPROM or a RAM via a program storage medium, a network, or a telephone line.

INDUSTRIAL APPLICATION

The present invention relates to a wireless base station that wirelessly connects a plurality of mobile stations by spatial multiplexing using an array antenna. The wireless base station is constructed to detect a deviation of a signal received from a mobile station, and uses the detected deviation to separate a signal intended for the mobile station from reception signals when new wireless connection to the mobile station is performed by forming an antenna directivity. The wireless base station is suitable for use as a base station for mobile communication systems.

The invention claimed is:

1. A wireless base station that transfers a plurality of mobile stations from control channels to communication channels and wirelessly connects the plurality of mobile stations by spatial multiplexing using an array antenna via the communication channels, comprising:

detection means for detecting a deviation of a signal that has been received from a mobile station, the deviation being at least one of (a) a timing offset that indicates a deviation of a timing at which the signal was received via a control channel from the mobile station in a periodical reception timeslot of the wireless base station, from a specific timing in the periodical reception timeslot being set as a reference, and (b) a frequency offset that indicates a deviation of a frequency of a carrier wave allocated to the mobile station, from a frequency of the signal that has been received via a control channel from the mobile station; and separation means for, using the detected deviation; (a) correcting reception signals that have been received from the mobile stations and (b) separating a signal intended for the mobile station from the corrected reception signals via a communication channel, when new wireless connection to the mobile station is performed by forming an antenna directivity.

2. The wireless base station of claim 1, wherein
the detection means includes:
a first detection unit for detecting a timing offset that indicates a deviation of a timing at which the signal was received from the mobile station in a periodical reception timeslot of the wireless base station, from a specific timing in the periodical reception timeslot being set as a reference; and
a second detection unit for detecting a frequency offset that indicates a deviation of a frequency of a carrier wave allocated to the mobile station, from a frequency of the signal that has been received from the mobile station, and
the separation means corrects that reception signals that have been received from the mobile stations using the dining offset and the frequency offset, and separates the signal intended for the mobile station from the corrected reception signals.

3. The wireless base station of claim 2, wherein
the first detection unit and the second detection unit detect the timing offset and the frequency offset in a reception timeslot in which a communication channel request message has been received from the mobile station via a control channel, the communication channel request message requesting to establish a communication channel, and
the separation means corrects, using the timing offset and the frequency offset, the reception signals in a reception timeslot in which a synchronization signal has been received from the mobile station via the communication channel, the synchronization signal being transmitted to follow the communication channel request message.

4. The wireless base station of claim 3, wherein
the detection means further includes a calculation unit for calculating weight vectors for the mobile station, by performing array reception in the reception timeslot of the communication channel request message, and
the separation means uses the weight vectors as initial values, to separate the signal intended for the mobile station in the reception timeslot of the synchronization signal.

5. A program storage medium storing a program readable by a digital signal processor provided in a wireless base station that transfers a plurality of mobile stations from control channels to communication channels and wirelessly connects the plurality of mobile stations by spatial multiplexing using an array antenna via the communication channel, the program realizing:

detection means for detecting a deviation of a signal that has been received from a mobile station, the deviation being at least one of (a) a timing offset that indicates a deviation of a timing at which the signal was received via a control channel from the mobile station in a periodical reception timeslot of the wireless base station, from a specific timing in the periodical reception timeslot being set as a reference, and (b) a frequency offset that indicates a deviation of a frequency of a carrier wave allocated to the mobile station, from a frequency of the signal that has been received via a control channel from the mobile station; and separation means for, using the detected deviation, (a) connecting reception signals that have been received from the mobile stations and (b) separating a signal intended for the mobile station from the corrected reception signals via a communication channel, when a new wireless connection to the mobile station is performed by forming an antenna directivity.

* * * * *